United States Patent
Bueche, Jr.

(10) Patent No.: US 11,798,094 B1
(45) Date of Patent: *Oct. 24, 2023

(54) SYSTEMS AND METHODS FOR MANAGING AN INSURANCE POLICY FOR A VEHICLE

(71) Applicant: United Services Automobile Association (USAA), San Antonio, TX (US)

(72) Inventor: Michael Patrick Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 566 days.

This patent is subject to a terminal disclaimer.

(21) Appl. No.: 17/084,314

(22) Filed: Oct. 29, 2020

Related U.S. Application Data

(63) Continuation of application No. 15/973,840, filed on May 8, 2018, now Pat. No. 10,825,098.

(60) Provisional application No. 62/508,161, filed on May 18, 2017.

(51) Int. Cl.
  G06Q 40/08 (2012.01)
  G07C 5/08 (2006.01)

(52) U.S. Cl.
  CPC ........... *G06Q 40/08* (2013.01); *G07C 5/0808* (2013.01)

(58) Field of Classification Search
  CPC .................................................. G06Q 40/08
  See application file for complete search history.

(56) References Cited

U.S. PATENT DOCUMENTS

| | | | | |
|---|---|---|---|---|
| 9,311,676 | B2* | 4/2016 | Helitzer | G16Z 99/00 |
| 9,940,676 | B1* | 4/2018 | Biemer | G07C 5/008 |
| 10,599,143 | B1 | 3/2020 | Scott et al. | |
| 2002/0128882 | A1* | 9/2002 | Nakagawa | G06Q 30/02 705/4 |
| 2011/0196551 | A1* | 8/2011 | Lees | F41H 11/02 701/14 |
| 2015/0198748 | A1* | 7/2015 | Hettler | C03B 23/04 65/102 |
| 2015/0198948 | A1 | 7/2015 | Godley | |
| 2016/0167652 | A1* | 6/2016 | Slusar | G01C 21/3461 701/27 |
| 2016/0214533 | A1* | 7/2016 | Doyle | H04N 7/181 |

OTHER PUBLICATIONS

Smith, Dirk Edward; "Vehicle modeling and control for emergency maneuvering of automated highway vehicles"; Purdue University; (Year: 1993).
U.S. Appl. No. 15/615,620, filed Jun. 6, 2017, Stephen Young.

* cited by examiner

*Primary Examiner* — Edward Chang
(74) *Attorney, Agent, or Firm* — Fletcher Yoder, P.C.

(57) ABSTRACT

A system includes one or more sensors configured to acquire data indicative of a condition of one or more components of a vehicle. The system also includes one or more processors configured to receive the data, determine a risk profile for the vehicle based on the data, and determine an insurance cost for the vehicle based on the risk profile.

20 Claims, 1 Drawing Sheet

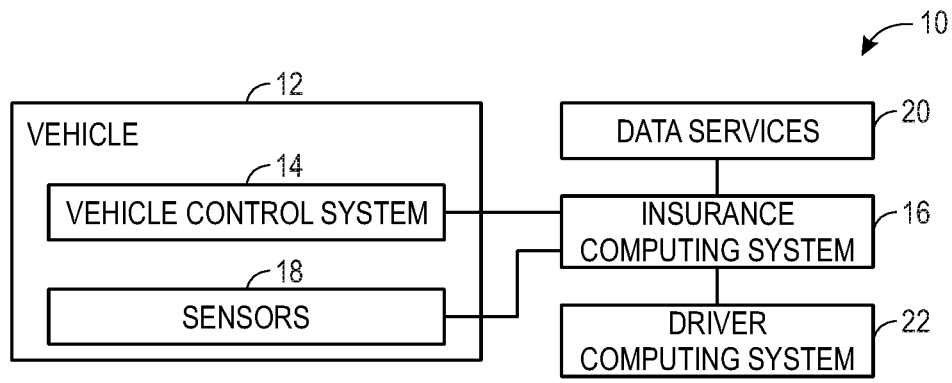
*FIG. 1*
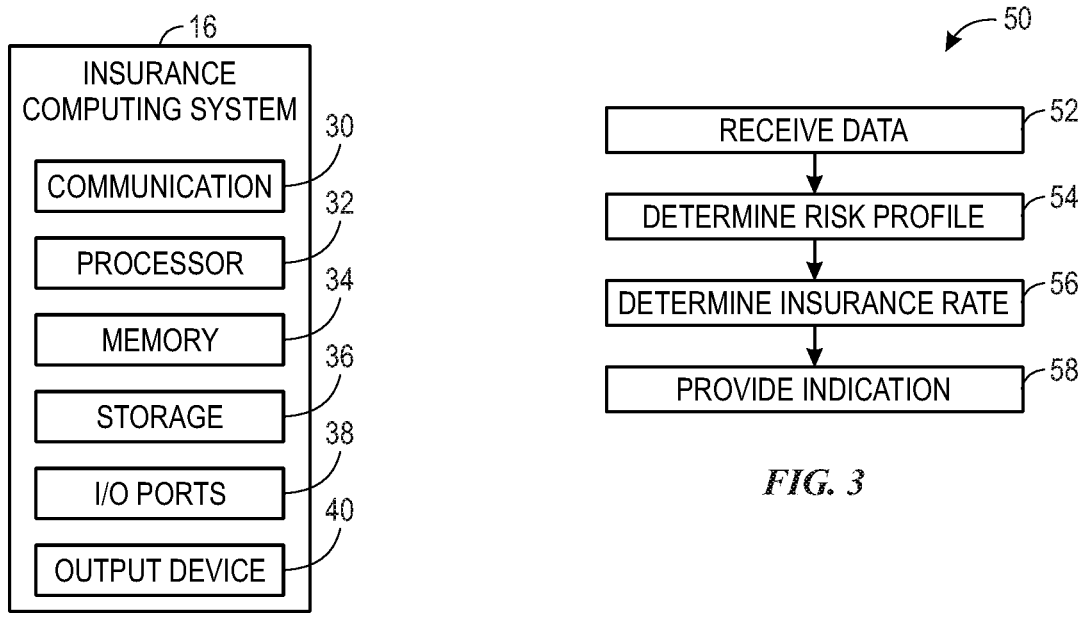
*FIG. 2*
*FIG. 3*

SYSTEMS AND METHODS FOR MANAGING AN INSURANCE POLICY FOR A VEHICLE

CROSS-REFERENCE TO RELATED APPLICATION

This application is a continuation of U.S. patent application Ser. No. 15/973,840, entitled "SYSTEMS AND METHODS FOR MANAGING AN INSURANCE POLICY FOR A VEHICLE," filed May 8, 2018, which claims priority to and the benefit of U.S. Provisional Application No. 62/508,161, entitled "SYSTEMS AND METHODS FOR MANAGING AN INSURANCE POLICY FOR A VEHICLE," filed May 18, 2017, which are hereby incorporated by reference in their entirety for all purposes.

BACKGROUND

The present disclosure relates generally to systems and methods for managing an insurance policy for a vehicle. More specifically, the present disclosure relates to monitoring certain conditions related to the vehicle and adjusting the insurance policy for the vehicle based at least in part on the monitored conditions.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Vehicle insurance premiums may be based primarily on characteristics of a driver, including historical driving data associated with the driver. Insurers often gather the historical driving data from citation records, insurance claims, questionnaires, interviews, and so forth. For example, an insurer may increase the driver's insurance premium if the driver has received citations for driving at excessive speeds, which may increase the risk of the driver causing an incident for which the insurer will ultimately be at least partly financially responsible. It is now recognized that characteristics of the vehicle, including a current or real-time condition of the vehicle, may be useful in accurate risk analysis and determination of an insurance premium.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system includes one or more sensors configured to acquire data indicative of a condition of one or more components of a vehicle. The system also includes one or more processors configured to receive the data, determine a risk profile for the vehicle based on the data, and determine an insurance cost for the vehicle based on the risk profile.

In an embodiment, a system includes one or more processors configured to receive an indication of one or more characteristics of an autonomous driving algorithm that controls an autonomous vehicle. The one or more processors are also configured to determine a risk profile of the autonomous vehicle based on the indication and to determine an insurance cost for the autonomous vehicle based on the risk profile.

In an embodiment, a method of adjusting an insurance feature for a vehicle includes receiving, at one or more processors, an indication of one or more characteristics of an autonomous driving algorithm that controls the vehicle. The method includes receiving, at the one or more processors, data acquired by one or more sensors, wherein the data is indicative of a condition of one or more components of the vehicle. The method also includes determining, using the one or more processors, a risk profile for the vehicle based on the indication and the data. The method further includes determining, using the one or more processors, an insurance cost for the vehicle based on the risk profile.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 1 illustrates a block diagram of a vehicle insurance management system, in accordance with embodiments described herein;

FIG. 2 illustrates a block diagram of components that may be part of an insurance computing system of the vehicle insurance management system of FIG. 1, in accordance with embodiments described herein; and FIG. 3 illustrates a flow chart of a method for determining an insurance policy using the vehicle insurance management system of FIG. 1, in accordance with embodiments described herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A condition or a characteristic (e.g., physical condition, operational characteristic, maintenance characteristic, or external condition) related to a vehicle may change over time. For example, tire pressure may fall outside of an acceptable range, brake pads may wear, or a driver may deactivate a car alarm. Accordingly, it may be desirable to monitor one or more conditions and/or characteristics related to the vehicle, and to determine and/or adjust an insurance policy (e.g., insurance feature, cost, rate) for the vehicle based at least in part on the one or more conditions and/or characteristics. In some embodiments, the vehicle may include sensors configured to monitor tire pressure, brake condition, safety device condition (e.g., condition of air bags, car alarm, door locks), or other physical condition of the vehicle. A vehicle insurance management system may receive and analyze the data obtained by the sensors to determine and/or adjust the insurance policy for the vehicle. The vehicle insurance management system may additionally or alternatively receive and analyze various other types of data, including various operational characteristics (e.g., vehicle location, vehicle speed, driver alertness), maintenance characteristics (e.g., date of a last maintenance check or tune-up), external conditions (e.g., current traffic conditions, current road conditions, current weather conditions, local crime conditions), or any combination thereof, to determine and/or adjust the insurance policy for the vehicle.

The foregoing examples include several types of data and associated analysis that may be used to determine the insurance policy for the vehicle. Another type of data that may be used includes autonomous driving characteristics of the vehicle. In particular, certain vehicles are capable of controlling driving operations of the vehicle, such that a human may not interact or control the vehicle as the vehicle drives to some destination. The vehicle insurance management system disclosed herein may be particularly useful for determining and/or adjusting insurance policies for such autonomous vehicles. In some such embodiments, the vehicle insurance management system may additionally or alternatively receive and analyze autonomous driving characteristics, such as characteristics of an autonomous driving algorithm or software used by the vehicle (e.g., type, manufacturer, features of the algorithm, safety record associated with the algorithm), whether the autonomous driving software is up-to-date (e.g., all updates have been completed), a type of safety and/or sensing equipment installed in the vehicle (e.g., quality of cameras used to facilitate autonomous driving), or any combination thereof, to determine and/or adjust the insurance policy for the vehicle.

In this way, the vehicle insurance management system may evaluate data related to the vehicle and/or actively monitor the condition or characteristics of the vehicle to determine and/or adjust the insurance policy for the vehicle. In certain embodiments, the vehicle insurance management system may periodically (e.g., at every 1, 2, 3, or 6 months or every 1, 12, 24, or 48 hours) or continuously adjust the insurance policy for the vehicle. For example, the vehicle insurance management system may determine and/or adjust the insurance policy at the beginning of each driving trip, at the beginning of each day, or as the vehicle travels, such that the insurance policy varies during a single driving trip. In certain embodiments, the vehicle insurance management system may be configured to provide an indication related to the insurance policy. For example, the vehicle insurance management system may provide an indication of a current insurance cost, an indication of a possible upcoming change in the insurance cost, and/or an indication of steps that may be taken to reduce the insurance cost or to avoid the change in the insurance cost (e.g., via a display or speaker within the vehicle or via a separate computing device, such as a mobile phone, tablet).

With the foregoing in mind, FIG. 1 illustrates a block diagram of a vehicle insurance management system 10 that may be configured to determine and/or adjust an insurance policy for a vehicle 12 (e.g., an autonomous vehicle). The vehicle 12 may be any suitable vehicle (e.g., car, van, truck, farming equipment, construction equipment), and may be partially or fully controlled and operated via a processor-based device, such as a vehicle control system 14.

As shown, the vehicle insurance management system 10 includes an insurance computing system 16 (e.g., computational platform). Components of the insurance computing system 16 may be located at any suitable location, including within the vehicle 12 or at a remote location. The insurance computing system 16 may include or be part of a supercomputer that utilizes multiple computing systems 16, a cloud computing system, or the like, and it should be understood that all or some of the processing functions described herein with respect to the insurance computing system 16 may be carried out by the vehicle control system 14, any other suitable computing system, or a combination of such systems.

The insurance computing system 16 may be configured to receive data, such as data indicative of a physical condition of a component (e.g., tires, brakes, air bags, car alarm, door locks) of the vehicle 12, a location of the vehicle 12, a condition of a driver of the vehicle 12 (e.g., driver alertness), a type of autonomous driving algorithm used by the vehicle 12 (e.g., manufacturer, features of the algorithm, safety record associated with the algorithm), whether the autonomous driving software is up-to-date (e.g., all available updates completed), types of safety and/or sensing equipment installed in the vehicle 12 (e.g., quality of cameras used to facilitate autonomous driving, or the like), maintenance information, traffic conditions, road conditions, weather conditions, and/or crime conditions of an area in which the vehicle 12 is located, and the like. The insurance computing system 16 may receive data from various data sources, such as the vehicle control system 14, sensors 18 positioned about the vehicle 12, data services 20, a driver computing system 22 (e.g., a computer, mobile device, mobile phone, tablet), and the like. Generally, the data received from the various data sources may be used by the insurance computing system 16 to determine a risk profile for the vehicle 12 and/or to determine and/or adjust the insurance policy for the vehicle 12. For example, upon detecting conditions that change the risk profile (e.g., a risk of injury to the driver, the passenger, other drivers, or any physical property), the insurance computing system 16 may determine and/or adjust the insurance policy for the vehicle 12.

The sensors 18 may include any suitable sensing device configured to detect various conditions related to the vehicle 12, and data obtained by the sensors 18 may be processed via one or more algorithms (e.g., at the insurance computing system 16 or other processing system). For instance, the sensors 18 may include one or more tire pressure sensors configured to detect an air pressure of the tires of the vehicle 12, one or more fluid sensors configured to detect a fluid level of components of the vehicle 12 (e.g., oil, radiator fluid, transmission fluid, power steering fluid, brake fluid), a brake wear sensor configured to detect a wear condition of brake pads of the vehicle 12, a mechanical or electrical sensor configured to detect whether air bags, car alarms, or door locks are activated or functioning properly, or the like. In some embodiments, the sensors 18 may include one or more seat belt sensors configured to detect proper attachment of seat belts or restraints for all occupants in the vehicle 12. In certain embodiments, the sensors 18 may include location sensors configured to provide location information regarding the vehicle 12. For example, the sensors 18 may provide global positioning system (GPS) coordinates or the like to indicate a location of the vehicle 12.

In certain embodiments, the sensors 18 may include sensors configured to detect a condition of a driver of the vehicle 12, as in some cases, the driver should be alert to drive, provide inputs, or to take over control of the vehicle 12 from an autonomous operation mode. Thus, the sensors 18 may include one or more machine vision sensors, such as imaging sensors (e.g., optical sensors) or cameras, configured to track motions or movements of the driver. The sensors 18 may additionally or alternatively include sensors configured to detect vibration, touch, temperature, sound, speed, or motion, which may be indicative of driver alertness. Such sensors 18 may be disposed at various locations within the vehicle 12 such as the steering wheel, dashboard, seat, armrest, mirrors, and the like. In certain embodiments, such sensors 18 may be disposed on devices carried by or worn by the driver. For example, such sensors 18 may be disposed on mobile phones, wearable electronics, or the like. It should be appreciated that data from the sensors 18 may also be utilized by the vehicle control system 14 to control the vehicle 12.

In certain embodiments, the vehicle control system 14 may store and provide data indicative of a type of vehicle, a type of autonomous driving algorithm used by the vehicle 12, whether the autonomous driving software is up-to-date, types of safety and/or sensing equipment installed in the vehicle 12, maintenance information, or the like. For example, various manufacturers may utilize different autonomous driving software, which may have different features and safety records. Thus, such information may be useful for determining the risk profile and the insurance policy for the vehicle 12.

Furthermore, the data services 20 may be configured to obtain and to provide data related to traffic conditions, road conditions, weather conditions, and/or crime conditions of an area. For example, the data services 20 may include one or more databases, websites, or information collection organizations that acquire data regarding individuals, vehicles, environment, and the like. For instance, the data services 20 may include social media websites that are updated to indicate events in the vicinity of the vehicle 12. In some instances, the social media data may include information regarding a natural disaster, traffic conditions, dangerous situation (e.g., crime, active shooter), road conditions, and the like.

In addition, the data services 20 may include electronic news sources that may be updated in real time or near real time via a network (e.g., Internet). The electronic news sources may provide information regarding weather alerts, natural disaster alerts, non-natural disaster alerts (e.g., traffic, crime, active shooter), and any other information that may be published via an electronic news outlet such as a webpage, news database, or the like. The data services 20 may also provide information related to road conditions (e.g., ice, snow) of the roads being driven on by the vehicle 12. Road condition information may also include information regarding whether construction is present along a traveled path or route, recent accidents, and the like.

In some embodiments, the driver computing system 22 may be configured to receive inputs from the driver, such as an input to confirm the completion of a maintenance task, to provide a final destination for an upcoming driving trip, or the like, and the driver computing system 22 may provide such information to the insurance computing system 16. The data from the vehicle control system 14, the sensors 18, the data services 20, and/or the driver computing system 22 may be provided to the insurance computing system 16 via a wired or wireless communication link. The insurance computing system 16 may use the data to determine a risk profile for the vehicle 12 and/or to determine and/or adjust an insurance policy for the vehicle 12.

By way of example, the data acquired by the sensors 18 may indicate that the tire pressure is inadequate (e.g., outside of a predetermined acceptable range). Upon receipt of the data from the sensors 18, the insurance computing system 16 may determine that there is an increased risk associated with operating the vehicle 12. In some embodiments, the insurance computing system 16 may increase an insurance cost of the insurance policy for the vehicle 12 until the tire pressure is corrected (e.g., detected to be within the predetermined acceptable range). In some embodiments, the insurance cost may automatically increase in response to receipt of the data from the tire pressure sensor that indicates the tire pressure is outside of the predetermined acceptable range. In some embodiments, the insurance cost may then automatically decrease in response to receipt of the data from the tire pressure sensor that indicates the tire pressure is within the predetermined acceptable range. In this manner, the insurance cost may be periodically or continuously adjusted based on conditions of components of the vehicle 12 and/or based on other information related to the vehicle 12. As discussed in more detail below, in some embodiments, the insurance computing system 16 may be configured to provide an alert (e.g., visual or audible alert within the vehicle 12 or via the driver computing device 22) that the insurance cost may increase if the tire pressure is not corrected within a certain period of time or distance traveled.

It should be appreciated that the insurance computing system 16 may be configured to adjust and apply insurance costs based on time (e.g., dollars per minutes, hours, or days) or based on a distance traveled (e.g., dollars per kilometers). That is, the insurance cost may be applied on a per unit of time basis or may be applied on a per unit of distance basis. For example, if the higher risk profile (e.g., due to the unacceptable tire pressure) persists for five hours, the higher insurance cost will be applied for the five hours. However, in some embodiments, if vehicle travels two kilometers while the higher risk profile exists (e.g., due to the unacceptable tire pressure), the higher insurance cost will be applied for the two miles.

In some embodiments, the insurance computing system 16 may be configured to provide an indication (e.g., a numerical value) of the insurance cost to the driver via an output device, such as via a display or a speaker within the vehicle 12 or via the driver computing system 22. The indication may be provided at certain times (e.g., when the vehicle 12 is turned on), each time the insurance cost changes, each time the insurance cost changes by more than a certain amount or percentage (e.g., by more than 5, 10, 15, 20, 25, or 50 percent), or continuously. For example, each time the driver turns on the vehicle 12 or otherwise activates the insurance computing system 16, the insurance computing system 16 may analyze the data from the sensors 18, data services 20, and the driver computing system 22, to determine the insurance cost and may provide the indication of the insurance cost to the driver. In this manner, the driver may know the insurance cost (e.g., an initial insurance cost) that will be applied as the vehicle 12 begins traveling. In some embodiments, this initial insurance cost may be applied for the entire trip (e.g., until the engine of the vehicle 12 is turned off), for a certain period of time (e.g., 1, 2, 3, or 6 months or 1, 12, 24, or 48 hours), or the like, even if the risk profile changes. However, in some embodiments, the insurance computing system 16 may be configured to continuously or periodically update the insurance cost during the trip or throughout the day, and the indication of the insurance cost may be provided at each change or continuously, for example. In some embodiments, the insurance computing system 16 may estimate or predict changes to the insurance cost that may occur during the trip (e.g., based on inputs of a target destination, as well as traffic, weather, and/or crime along the route to the target destination), and the insurance computing system 16 may provide an indication of the estimated insurance cost for a particular planned or upcoming trip to the driver (e.g., in response to the vehicle 12 being turned on).

In some embodiments, the insurance computing system 16 may be configured to provide an indication of reasons for the current insurance cost or factors that may be addressed by the driver to lower the insurance cost (e.g., increase tire pressure, complete maintenance, update software that controls the vehicle 12, activate car alarm, or the like). In some embodiments, the insurance computing system 16 may provide a grace period between detection of an increased risk profile and application of an increased insurance cost. In some such embodiments, the insurance computing system 16 may provide an indication of the grace period to the driver. For example, upon detection of tire pressure outside of the acceptable range and determination of a corresponding increased risk profile, the insurance computing system 16 may provide an indication to the driver that the tire pressure is outside of the acceptable range, and may provide an indication to the driver that the insurance cost will increase if the tire pressure is not corrected before the engine is turned off and restarted (e.g., prior to another trip), within a certain time period (e.g., 1, 12, 24, 36, or 48 hours), or within a certain distance (e.g., 1, 10, 20, or 30 miles). The grace period may vary based on various factors, such as the risk profile, amount by which the tire pressure falls outside of the acceptable range, time of day, weather, availability of air to fill tires (e.g., tire pressure stations), crime statistics at the current location, or the like. Although the indications have been described as being displayed on a display or presented in an audible format, it should be noted that the indications (e.g., an indication of a change in the insurance cost) may be provided by any suitable means including a vibration provided at the hands, feet, or other body part of the driver, or a combination of the various indications described herein.

It should be appreciated that various combinations of conditions and characteristics may be considered together to determine the insurance cost for the vehicle. For example, the insurance computing system 16 may consider one or more operational characteristics (e.g., ground speed of the vehicle 12) in combination with one or more physical conditions of the vehicle (e.g., tire pressure). Thus, if the ground speed is above a threshold ground speed and the tire pressure is also outside of the acceptable range, the insurance computing system 16 may determine an increased risk and increase the insurance cost (e.g., greater than if the ground speed is below the threshold ground speed and the tire pressure is outside of the acceptable range). In some embodiments, the insurance cost may not increase unless multiple factors that indicate an increased risk exist. For example, the insurance cost may not increase unless both the ground speed and the tire pressure fall outside of the respective acceptable thresholds or ranges.

In some embodiments, the insurance computing system 16 may determine and provide various indications related to the conditions and/or characteristics to the driver. For example, upon starting the vehicle 12, the insurance computing system 16 may determine that there is an increased risk (e.g., due to tire pressure or other data received) and may provide an indication to the driver that the insurance cost will increase unless one or more operational characteristics are maintained, such as unless the ground speed of the vehicle 12 is maintained below the threshold ground speed. Thus, the driver may be incentivized and encouraged to drive on surface streets and avoid highways until the physical condition or other factor causing the increased risk is resolved. In some cases, the insurance computing system 16 may determine that there is an increased risk while driving due to one or more operational characteristics (e.g., driving at a ground speed above the threshold ground speed) and may provide an indication that the insurance cost will increase unless the operational characteristic is adjusted (e.g., ground speed of the vehicle 12 is reduced below a threshold ground speed) within a period of time (e.g., 1, 5, 10, or 15 minutes).

With respect to autonomous vehicles, the insurance computing system 16 may provide an instruction to the vehicle control system 14 to control or to limit operational characteristics (e.g., the ground speed of the vehicle 12) during periods of increased risk (e.g., due to tire pressure or other data received), such as to block the vehicle 12 from traveling over the threshold ground speed or to block the vehicle 12 from traveling over the threshold ground speed for extended periods of time (e.g., more than 1, 2, 5, 10, or 15 minutes), for example. In some embodiments, the insurance computing system 16 may provide an instruction to the vehicle control system 14 to control or to recommend the route traveled by the vehicle 12, such as to avoid highways or slick roads during periods of increased risk (e.g., due to tire pressure or other data received).

The insurance computing system 16 may include certain components to facilitate these actions. FIG. 2 is a block diagram of example components within the insurance computing system 16. For example, the insurance computing system 16 may include a communication component 30, a processor 32, a memory 34, a storage 36, input/output (I/O) ports 38, an output device 40 (e.g., a display or a speaker), or any of a variety of other components that enable the insurance computing system 16 to carry out the techniques described herein. The communication component 30 may be a wireless or wired communication component that may facilitate communication between the vehicle control system 14, the sensors 18, the data services 20, and the driver computing system 22. In the illustrated embodiment, the memory 34 stores code executable by the processor 32 to perform operations and method steps in accordance with the present embodiments.

The processor 32 may be any suitable type of computer processor or microprocessor capable of executing computer-executable code. The processor 32 may also include multiple processors that may perform the operations described below. The memory 34 and the storage 36 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 34 and the storage 36 may also be used to store the data, various other software applications, and the like. The memory 34 and the storage 36 may represent non-transitory computer-readable media (e.g., any suitable form of memory or storage) that may store the processor-executable code used by the processor 32 to perform various techniques described herein. It should be noted that non-transitory merely indicates that the media is tangible and not a signal.

The I/O ports 38 may be interfaces that may couple to other peripheral components such as input devices (e.g., keyboard, mouse), sensors, input/output (I/O) modules, and the like. The output device 40 may operate to depict indications associated with software or executable code processed by the processor 32. In one embodiment, the output device 40 may be an input device. For example, the output device 40 may include a touch display capable of receiving inputs from a user of the insurance computing system 16. The output device 40 may be any suitable type of display, such as a liquid crystal display (LCD), plasma display, or an organic light emitting diode (OLED) display, for example. In one embodiment, the output device 40 may depict or otherwise provide the indications described above regarding the insurance cost.

It should be noted that the components described above with regard to the insurance computing system 16 are exemplary components and the insurance computing system 16 may include additional or fewer components as shown. Additionally, it should be noted that the vehicle control system 14 and the driver computing system 22 may also include similar components as described as part of the insurance computing system 16. With the foregoing in mind, additional details with regard to determining the insurance cost is discussed below with reference to FIG. 3.

FIG. 3 illustrates a flow chart of a method 50 for determining an insurance policy for the vehicle 12. The following description of the method 50 will be described as being performed by the insurance computing system 16, but it should be noted that any suitable processor-based device may be specially programmed to perform any of the steps of the methods described herein. Moreover, although the following description of the method 50 is described in a particular order, it should be understood that the steps of the method 50 may be performed in any suitable order in other embodiments.

At block 52, the insurance computing system 16 may receive data such as data regarding a physical condition of a component of the vehicle 12; operational characteristics related to the vehicle 12; autonomous driving characteristics, such as an autonomous driving algorithm used by the vehicle 12, whether the autonomous driving software is up-to-date, types of safety and/or sensing equipment installed in the vehicle 12; maintenance characteristics; and/or external conditions, such as traffic conditions, road conditions, weather conditions, and/or crime conditions of an area in which the vehicle 12 is located, and the like. As discussed above, the data may be acquired via the sensors 18, the data services 20, the driver computing system 22, or the like.

At block 54, the insurance computing system 16 may analyze the data to determine a risk profile for the vehicle 12. For example, the insurance computing system 16 may compare the data to thresholds (e.g., acceptable tire pressure, acceptable fluid levels) and/or input the data into an algorithm to calculate the risk profile. In block 56, the insurance computing system 16 may determine and/or adjust the insurance policy based at least in part on the data and/or on the risk profile for the vehicle 12. As noted above, in certain embodiments, the insurance computing system 16 may periodically or continuously determine and/or adjust the insurance policy for the vehicle 12. In some embodiments, the insurance computing system 16 may determine and provide a grace period before applying an increased insurance cost. The insurance computing system 16 may also consider driving characteristics (e.g., ground speed) to determine and/or adjust the insurance policy.

At block 58, the insurance computing system 16 provides an indication, such as an indication of an insurance cost, reasons for the insurance cost, steps that may be taken to reduce the insurance cost, an estimated insurance cost for an upcoming trip, an indication of a possible upcoming change in the insurance cost, a grace period, or the like. The indication may be provided at certain times (e.g., when the vehicle 12 is turned on), each time the insurance cost changes, each time the insurance cost changes by more than a certain percentage, or continuously, for example. The insurance computing system 16 may provide the indication via a display or speaker within the vehicle 12, via the driver computing device 22, and/or via any suitable means, including a vibration provided at the hands, feet, or other body part of the driver, or a combination of the various indications described herein. In this way, the insurance computing system may determine and/or adjust the insurance policy for the vehicle 12, and may provide an indication of the insurance cost and/or change in insurance cost to the driver of the vehicle 12.

By way of example, in certain embodiments, the insurance computing system 16 may receive data indicative of characteristics of an autonomous driving algorithm used by the vehicle 12 and an indication of a physical condition of a component of the vehicle 12, such as air pressure of the tires of the vehicle 12. The insurance computing system 16 may determine a risk profile for the vehicle 12 based on the data, determine an insurance cost based on the risk profile, and/or may provide an indication related to the insurance cost to the driver. The insurance computing system 16 may receive data over time, and may update and/or adjust the risk profile, the insurance cost, and/or the indication based on the newly received data, thereby providing a dynamic insurance cost for the vehicle 12. In some embodiments, the insurance computing system 16 may communicate with the vehicle control system 14 to control or limit operational characteristics of the vehicle 12 (e.g., ground speed or route traveled) based on the risk profile, for example.

The embodiments disclosed herein provide improved systems and methods for efficiently and effectively determining and adjusting insurance costs based on characteristics related to the vehicle 12, and in some cases, characteristics related to autonomous driving features of the vehicle 12. The systems and methods also efficiently and effectively provide information regarding the insurance costs, as well as factors related to the insurance costs, to the driver. By considering current or up-to-date data related to the vehicle 12, the disclosed systems and methods may determine appropriate insurance costs for the vehicle 12 continuously or at certain intervals, thereby providing more appropriate insurance coverage for the driver compared to prior systems.

Examples provided herein, including one or more examples provided within parentheses, are provided to facilitate discussion and are not intended to be limiting. While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method, comprising: receiving, at one or more processors, one or more indications of one or more characteristics of an autonomous driving algorithm that is configured to control a vehicle, wherein the one or more characteristics comprise whether the autonomous driving algorithm is up-to-date: receiving, at the one or more processors, data acquired by one or more sensors, wherein the data is indicative of a respective condition of one or more components of the vehicle; determining, using the one or more processors, a risk profile for the vehicle based on the one or more indications and the data; and instructing, using the one or more processors, a vehicle control system to limit an operational characteristic of the vehicle, a route traveled by the vehicle, or both based on the risk profile.

2. The method of claim 1, comprising determining, using the one or more processors, an insurance cost for the vehicle based on the risk profile.

3. The method of claim 2, comprising instructing, using the one or more processors, an output device to provide output indicative of the insurance cost to a driver of the vehicle.

4. The method of claim 3, comprising:
determining, using the one or more processors, a maintenance procedure that, if completed, would reduce the insurance cost for the vehicle, wherein the maintenance procedure is based on the data indicative of the respective condition of the one or more components of the vehicle; and
instructing, using the one or more processors, the output device to provide output indicative of the maintenance procedure to the driver of the vehicle.

5. The method of claim 1, comprising increasing, using the one or more processors, a risk level associated with the risk profile in response to the respective condition of a first component of the one or more components of the vehicle being outside of a range.

6. The method of claim 5, comprising increasing, using the one or more processors, an insurance cost of the vehicle until the respective condition of the first component of the one or more components of the vehicle is within the range.

7. The method of claim 1, comprising instructing, using the one or more processors, the vehicle control system to limit the operational characteristic of the vehicle, the route traveled by the vehicle, or both in response to a risk level associated with the risk profile exceeding a risk threshold.

8. The method of claim 1, comprising instructing, using the one or more processors, the vehicle control system to limit the operational characteristic of the vehicle and the route traveled by the vehicle based on the risk profile.

9. The method of claim 1, wherein instructing, using the one or more processors, the vehicle control system to limit the operational characteristic of the vehicle comprises instructing the vehicle control system to limit a speed of the vehicle.

10. The method of claim 1, wherein the one or more characteristics comprise a safety record, a software update status, or both associated with the autonomous driving algorithm.

11. The method of claim 1, comprising:
receiving, at the one or more processors, an additional indication of a quality of a camera that is on the vehicle and that is configured to facilitate autonomous driving of the vehicle; and
determining, using the one or more processors, the risk profile for the vehicle based on the one or more indications, the data, and the additional indication.

12. A method, comprising:
receiving, at one or more processors, an indication of whether an autonomous driving algorithm that is configured to control a vehicle is up-to-date;
receiving, at the one or more processors, data acquired by one or more sensors, wherein the data is indicative of a condition of a component of the vehicle; and
instructing, using the one or more processors, a vehicle control system to limit an operational characteristic of the vehicle, a route traveled by the vehicle, or both in response to the autonomous driving algorithm not being up-to-date, the condition of the component of the vehicle being outside of a range, or both.

13. The method of claim 12, wherein the condition of the component of the vehicle comprises a tire pressure of a tire of the vehicle, and the method comprises instructing, using the one or more processors, the vehicle control system to limit the operational characteristic of the vehicle by instructing the vehicle control system to limit a speed of the vehicle in response to the tire pressure of the tire of the vehicle being outside of the range.

14. The method of claim 12, comprising:
continuously determining, using the one or more processors, a risk profile based on the indication and the data as the vehicle travels; and
continuously updating, using the one or more processors, an insurance cost for the vehicle based on the risk profile as the vehicle travels.

15. The method of claim 12, comprising instructing, using the one or more processors, the vehicle control system to limit the operational characteristic of the vehicle and the route traveled by the vehicle in response to the autonomous driving algorithm not being up-to-date, the condition of the component of the vehicle being outside of the range, or both.

16. The method of claim 12, comprising instructing, using the one or more processors, the vehicle control system to limit the operational characteristic of the vehicle by providing a speed limit for the vehicle to the vehicle control system in response to the autonomous driving algorithm not being up-to-date, the condition of the component of the vehicle being outside of the range, or both.

17. The method of claim 12, comprising instructing, using the one or more processors, the vehicle control system to limit the route traveled by the vehicle by providing routing for the vehicle that avoids certain roads in response to the autonomous driving algorithm not being up-to-date, the condition of the component of the vehicle being outside of the range, or both.

18. A system, comprising:
one or more processors configured to:
receive one or more indications of one or more characteristics of an autonomous driving algorithm that is configured to control a vehicle, wherein the one or more characteristics comprise whether the autonomous driving algorithm is up-to-date;
determine a risk level for the vehicle based on the one or more indications;
determine a future insurance cost for the vehicle based on the risk level;
determine that a software update is available to bring the autonomous driving algorithm up-to-date and that, if completed within a time period, would reduce the future insurance cost for the vehicle to a reduced future insurance cost for the vehicle;
output, via an electronic display, an additional indication of the software update, the time period, the future insurance cost, and the reduced future insurance cost; and
instruct a vehicle control system to limit an operational characteristic of the vehicle based on the risk level until completion of the software update to bring the autonomous driving algorithm up-to-date.

19. The system of claim 18, wherein the one or more processors are configured to:
receive data indicative of a quality of a camera that is on the vehicle and that is configured to facilitate autonomous driving of the vehicle; and determine the risk level for the vehicle based on the one or more indications and the data indicative of the quality of the camera.

20. The system of claim 18, wherein the one or more characteristics comprise a safety record, a manufacturer, or both associated with the autonomous driving algorithm.

\* \* \* \* \*